United States Patent Office 3,354,115
Patented Nov. 21, 1967

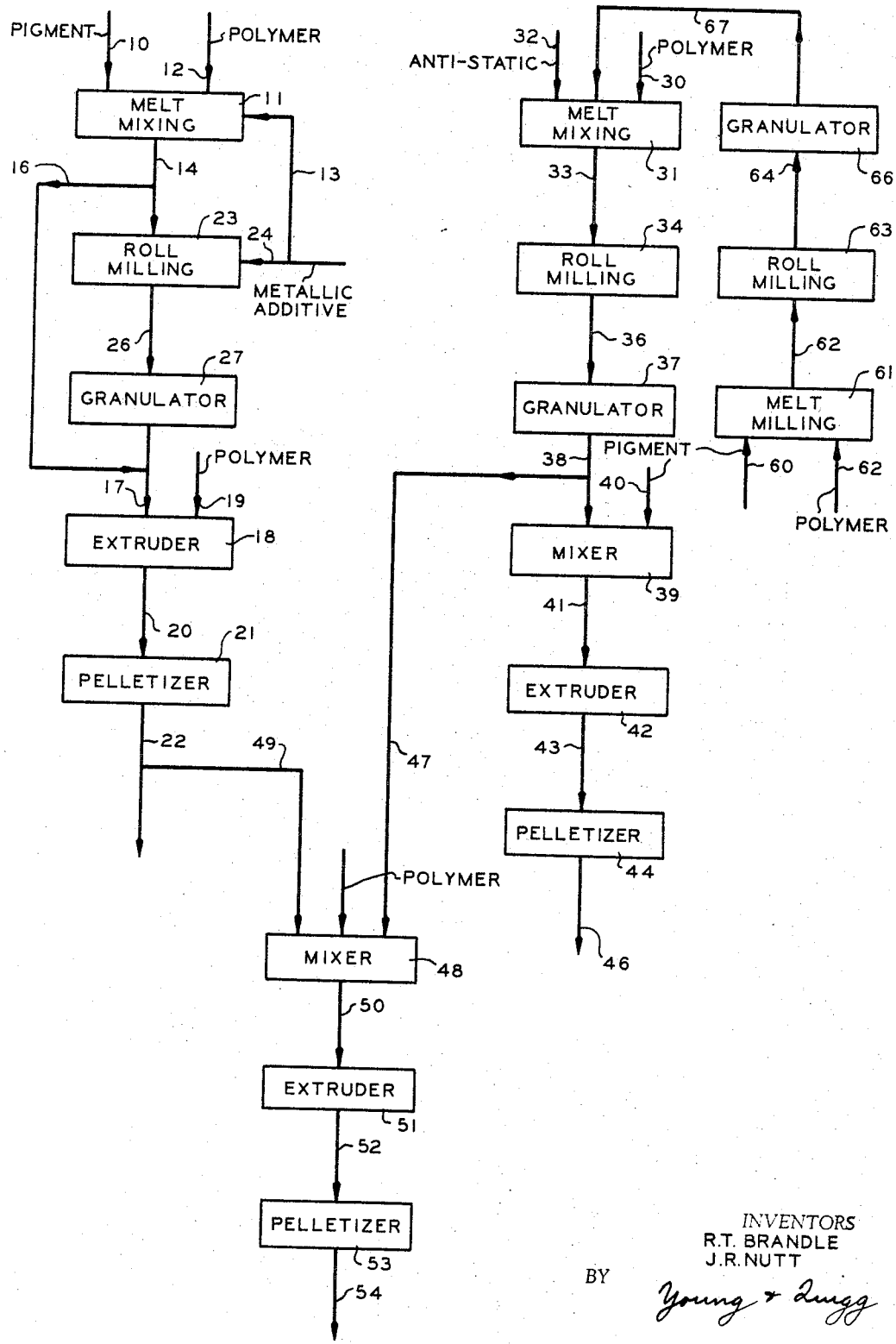

3,354,115
MULTIPLE ADDITIVE DISPERSION IN
1-OLEFIN POLYMERS
Robert T. Brandle and James R. Nutt, Houston, Tex., assignors to Phillips Petroleum Company, a corporation of Delaware
Filed Jan. 2, 1964, Ser. No. 335,312
8 Claims. (Cl. 260—41)

ABSTRACT OF THE DISCLOSURE

A compound product, having incorporated therein both a metallic additive and a pigment additive, is prepared by first melt blending polymer and the pigment additive and subsequently introducing the metallic additive either during the last of the melt blending step or in a separate relatively short milling step, thereby holding the melt blending history of the metallic additive to a minimum to prevent deterioration of the luster of the metallic additive. In instances where it is desired to incorporate an anti-static additive and a pigment additive (either with or without a metallic additive) one of the additives is melt blended separately with polymer and the resulting blend cooled to a solid state; this solid polymer can then be melt blended with the other additive.

---

This invention relates to a process for the addition of multiple additives to 1-olefin polymers.

It has been observed that in attempting to improve the properties such as color, pigment and anti-static properties of solid 1-olefin polymers by the use of additives, it is difficult to disperse the additives evenly throughout the polymer. It has further been observed that when the multiple additives are blended with the 1-olefin polymers, a blending process suitable for one additive may not be suitable for a second additive. It has also been observed that in the blending of multiple additives with 1-olefin polymers, the blending of one of the additives with the polymer may adversely affect the dispersion and general effectiveness of a second additive blended with said 1-olefin polymer.

When a metallic additive and pigment additive are conventionally blended with a 1-olefin polymer, the metallic additive causes varying colored effects in the finished extruded material. When an anti-static additive and a pigment additive are conventionally blended with a 1-olefin polymer, the resultant blend balls up and is difficult to process.

Accordingly, an object of our invention is to provide a process and apparatus for the dispersion of additives in polymers.

Another object of our invention is to provide a process and apparatus for the dispersion of pigment, anti-static and metallic additives in 1-olefin polymers.

Other objects, advantages and features of our invention will be readily apparent to those skilled in the art from the following description, the drawing and the appended claims.

We have discovered a process for the blending of metallic and pigment additives to 1-olefin polymers which comprises melt blending the pigment additive with the 1-olefin polymer and blending the metallic additive with the melted 1-olefin polymer containing the pigment additive in a second blending stage. We have further discovered a process for the blending of an anti-static additive and a pigment additive with a 1-olefin polymer which comprises melt blending the anti-static additive with the 1-olefin polymer, forming a solid polymer containing said anti-static additive, and blending a pigment additive with said 1-olefin polymer containing said anti-static additive. We have also discovered a process for the blending of an anti-static additive, a metallic additive and a pigment additive with a 1-olefin polymer which comprises melt blending an anti-static additive with a first portion of the 1-olefin polymer, forming a solid polymer containing said anti-static additives, melt blending a second portion of said 1-olefin polymer with a pigment additive, blending a metal additive with the melted 1-olefin polymer containing said pigment additive, forming a solid 1-olefin polymer containing said pigment and metallic additives, mixing said 1-olefin polymer containing said pigment and metallic additives with said 1-olefin polymer containing said anti-static additive, and melt blending the resultant mixture to form a solid 1-olefin polymer containing anti-static, metallic and pigment additive uniformly dispersed throughout said 1-olefin polymer.

It is difficult to blend multiple additives with a 1-olefin polymer and obtain uniform dispersion throughout the polymer. Conditions of blending a first additive to provide a product having uniform additive dispersion will often adversely affect the blending of the second additive with the polymer. This is particularly evident when attempting to blend a pigment additive with a polymer containing a metallic additive. Blending the pigment additive with the polymer containing the metallic additive and the simultaneous blending of the additives with the polymer results in the production of varying colored effects throughout the additive. It would appear that the uneven distribution of color might be a result of poor dispersion of the metallic and/or pigment additives. However, more thorough mixing did not provide any beneficial effect in forming a blended polymer of uniform color and having a uniform metallic lustre.

We have discovered that in the blending of pigment throughout the 1-olefin polymer when the pigment additives are effectively blended and uniformly dispersed throughout the 1-olefin polymer when the pigment additive is melt blended with the 1-olefin polymer in a first blending stage and the metallic additive is blended with the melted polymer containing the pigment additive in a second blending stage. We have further discovered that a longer blending period is required to blend the pigment additive with the 1-olefin polymer in the first blending stage than was required to blend the metallic additive with the 1-olefin polymer containing the pigment additive in the second blending stage. By employing a shorter blending period in the second blending stage a 1-olefin polymer product was obtained having a uniform metallic color.

A better understanding of the invention can be had by referring to the drawing which illustrates an embodiment of this invention.

Referring to the drawing, a pigment additive such as titanium dioxide, cadmium sulfide, phthalocyanine or ultramarine blue is passed via conduit means 10 to a melt mixing zone 11. A solid 1-olefin polymer is passed via conduit means 12 to melt mixing zone 11. The invention is applicable to the blending of 1-olefin polymers having a maximum of six carbon atoms per molecule. The polymerization product can be a homopolymer or a copolymer, or a mixture thereof. Suitable polymers include polymers or copolymers of 1-olefins such as ethylene, propylene, 1-butene, 1-pentene, 4-methyl-1-pentene, 3-methyl-1-butene, 3,3-dimethyl-1-butene and the like, polymerized by any suitable procedure.

Melt mixing zone 11 can comprise a Banbury mixer or other suitable means of melt blending the pigment and 1-olefin polymer. When a Banbury mixer is employed and the polymer feed to melt mixing zone 11 comprises 1-olefin solid pellets, the pellets can be charged into the Banbury mixer in two portions, half before adding the pigment and half immediately thereafter. This method of passing the pigment additive and polymer to the melt mixing zone 11 traps the pigment additive and reduces the quantity of pigment thrown out or lost in the mixer due to the action of the mixing rotors. After charging the mixer, the ram operating under a positive air pressure is lowered into the mixture and the frictional heat generated at this point will cause the 1-olefin polymer to melt and effect blending of the pigment additive and 1-olefin polymer.

The time of mixing and blending of the pigment additive and 1-olefin polymer will vary, depending upon the melt index and density of the 1-olefin polymer resin. If, for example, the 1-olefin polymer feed to melt mixing zone 11 comprises polyethylene, the mixing and blending time will normally be between 2 and 5 minutes with the ram operating under a positive air pressure of approximately 40 p.s.i.

We have discovered that the metallic additive can be blended with and dispersed throughout the 1-olefin polymer containing the pigment additive by (1) adding a powdered metallic additive directly to the melt mixing zone via conduit means 13 or by (2) the addition of metallic additive in a subsequent blending step hereinafter described. When the same blending conditions were employed for the blending of the metallic additive with the 1-olefin polymer containing the pigment additive as were employed in the blending of the pigment additive with the 1-olefin polymer, it has been discovered that the blending time in the second blending stage will be in the range of 5–50 and more preferably in the range of 10–35 percent of the time required in the first blending stage.

With the addition of the metallic additive to the 1-olefin polymer and pigment mixture in melt mixing zone 11, the metallic additive is passed via conduit means 13 to melt mixing zone 11 after the pigment additive has been blended with the 1-olefin polymer and near the end of the mixing and blending step. With the 1-olefin polymer feed to melt mixing zone 11 comprising polyethylene, the metallic additive is normally added about 30 seconds before the end of the mixing and blending cycle of melt mixing zone 11. Suitable metallic additives employed in the invention include aluminum, bronze and copper.

A 1-olefin polymer containing metallic and pigment additives is withdrawn from melt mixing zone 11 via conduit means 14 and passed via conduit means 16 and conduit means 17 to an extruder 18. Extruder 18 can be a conventional means for extruding a plastic material such as a Davis Standard Screw-Type Extruder manufactured by Davis-Standard Company, Mystic, Conn. The extruded product is withdrawn from extruder 18 via conduit means 20 and passed to a conventional pelletizer 21 wherein the extruded polymers containing metallic nad pigment additives is pelletized. The pelletized polymer material containing pigment and metallic additives is withdrawn from pelletizer 21 via conduit means 22.

In a second embodiment, 1-olefin polymer containing only the pigment additive is withdrawn from melt mixing zone 11 via conduit means 14 and passed to a means 23 for roll milling the melt mixing zone effluent such as a Stewart Bolling roll mill manufactured by Stewart Bolling & Company, Inc., Cleveland, Ohio. The rolls are heated and the molten 1-olefin polymer will adhere to the roll. Metallic additive is then added via conduit means 24 to the hot 1-olefin polymer and permitted to "work" on the rolls until the metallic additive is thoroughly blended into the hot molten 1-olefin polymer containing pigment additive. With the 1-olefin polymer comprising polyethylene, the rolls are normally heated to approximately 300° F.

After the mixing and blending step is completed, the rolls are cooled to approximately 150° F. and the 1-olefin polymer stripped from the mill by cutting with a knife a horizontal strip from the roll and pulling a continuous plastic sheet from the mill.

The sheeted 1-olefin polymer can be cut into slabs for easy handling. The thickness of the 1-olefin polymer sheet is controlled by an adjustable distance between the rolls and, although not to be limited thereto, the thickness of the 1-olefin sheet is normally about one-half inch.

After the 1-olefin slabs or sheets have been cooled to room temperature, the sheets are passed via conduit means 26 to a conventional granulator 27 wherein the 1-olefin polymer containing metallic and pigment additives is granulated to produce a resultant product of particle size. Although not to be limited thereto, the resultant granulated product can be about 2 mesh particle size. A suitable granulator is a Cumberland Granulator manufactured by Cumberland Engineering Company, Inc., Providence, R.I.

The granulated 1-olefin polymer containing the metallic and pigment additives is withdrawn from granulator 27 via conduit means 17 and passed to extruder 18 wherein the 1-olefin polymer containing metallic and pigment additive is extruded as heretofore described.

It is within the scope of this invention to prepare a concentrate comprising a 1-olefin polymer containing concentrations of pigment and metallic additives higher than that desired in the final blend. Under such conditions, it is within the scope of this invention to pass additional 1-olefin polymer to extruder 18 via conduit means 19 and to therein blend the solid concentrate and 1-olefin polymer to produce a final 1-olefin polymer produce containing a desired concentration of metallic and pigment additives. For example, the concentrate passed to extruder 18 via conduit means 17 can contain a concentration of pigment additive in the range of 15–65 weight percent of pigment additive and 1–8 weight percent metallic additive. By adding additional clear solid 1-olefin polymer via conduit means 19 so that the ratio of clear 1-olefin polymer to concentrate is 9 to 1, the extruded material withdrawn from conduit 18 via conduit means 20 will contain a concentration of pigment additive in the range of 1.5 to 6.5 weight percent and metallic additive in the range of 0.1 to 0.8 weight percent.

It has been observed that anti-static additives such as high molecular weight amines are extremely difficult to blend with 1-olefin polymers and particularly in combination with other additives such as pigment additives. Anti-static additives are lubricants and are therefore resistant to and adverse to normal blending techniques wherein the blending is dependent upon developing high shearing forces in the blending zone. We have discovered that improved blending and dispersion of an anti-static additive and other additives such as a pigment additive is effected by a two-stage blending process.

Referring to the drawing, solid 1-olefin polymer pellets can be passed via conduit means 30 to a melt mixing zone 31. Melt mixing zone 31 can comprise, as melt mixing zone 11, a Banbury mixer. The solid 1-olefin polymer passed to melt mixing zone 31 is melted within the said melt mixing zone 31 and an antistatic additive is passed to melt mixing zone 31 via conduit means 32. The antistatic additive and 1-olefin polymer is mixed and blended within melt mixing zone 31 and the effluent from melt mixing zone 31 is passed via conduit means 33 to a roll milling zone 34.

As in the case of roll milling zone 23, roll milling zone 34 can comprise a Stewart Bolling roll mill whereon the hot 1-olefin polymer material is worked on the rolls to form sheeted solid material which is stripped therefrom in the manner described in connection with roll milling zone 23. The sheeted 1-olefin polymer containing anti-static additive is passed via conduit means 36 to a granulator 37, operating as described in connection with granulator 27, to produce a granulated particle size 1-olefin polymer containing anti-static additive. Granulated 1-olefin polymer containing anti-static additive is withdrawn from granulator 37 via conduit means 38.

The 1-olefin polymer containing anti-static additive is passed to a mixer 39 such as a conventional cone or ribbon blender wherein the granulated 1-olefin polymer containing anti-static additive is mixed with a pigment additive passed to mixer 39 via conduit means 40. The mixture of pigment additive and 1-olefin polymer containing anti-static additive is passed via conduit means 41 from mixer 39 to an extruder 42 wherein the feed mixture is blended and extruded. As in the case of extruder 18, extruder 42 can be a conventional screw-type extruder well known in the art. The extruded 1-olefin polymer containing anti-static additive and pigment additives is passed through a conduit means 43 to a conventional pelletizer 44. Pelletizer 44 provides a pelletized 1-olefin product containing anti-static and pigment additives which is withdrawn from pelletizer 44 via conduit means 46.

It is within the scope of this invention to produce a 1-olefin polymer containing anti-static, pigment and metallic additives. Referring again to the drawing, the granulated 1-olefin polymer containing anti-static additive withdrawn from granulator 37 via conduit means 38 is passed via conduit means 47 to a conventional mixer 48 such as a cone or ribbon blender. 1-olefin polymer containing pigment and metallic additives is passed from pelletizer means 21 via conduit means 22 and 49 to mixer 48. The mixture is withdrawn from mixer 48 and passed via conduit means 50 to a conventional extruder 51 wherein the feed mixture is melted and extruded. The extruded plastic material is withdrawn from extruder 51 and passed via conduit means 52 to a conventional pelletizer 53. A pelletized 1-olefin polymer product containing metallic, pigment and anti-static additives is withdrawn from pelletizer 53 via conduit means 54.

It is also within the scope of this invention to produce a 1-olefin polymer containing pigment and anti-static additives wherein the pigment additive is blended with the 1-olefin polymer prior to the blending of the anti-static additive with the 1-olefin polymer. Referring again to the drawing, pigment additive is passed via conduit means 60 to melt mixing zone 61. Solid 1-olefin polymer is passed via conduit means 62 to melt mixing zone 61. Melt mixing zone 61 can be operated in the same manner as melt mixing zone 11 with the exception that metallic additive is not passed to melt mixing zone 61. Melted 1-olefin polymer containing pigment additive is passed from melt mixing zone 61 via conduit means 62 to a roll milling zone 63 and from the roll milling zone 63 via conduit means 64 to granulator 66. Roll milling zone 63 and granulator 66 can be operated as previously discussed in connection with roll milling zone 34 and granulator 37. A granulated 1-olefin polymer containing pigment additive is passed via conduit means 67 to melt mixing zone 31. Within melt mixing zone 31 the 1-olefin polymer containing pigment additive is melt blended with an anti-static additive passed via conduit means 32 to melt mixing zone 31. The remainder of the blending operation to include the operation of roll milling zone 34 and granulator 37 is as previously described. The granulated product withdrawn from granulator 37 via conduit 38 comprises a 1-olefin polymer containing anti-static and pigment additive.

The following example is presented as illustrative of the invention. It is not intended that the invention should be limited thereto.

*Example*

Polyethylene pellets having a density of 0.960 as determined by ASTM D1505–57T and a melt index of 0.9 as determined by ASTM D1238–57T are introduced into a Banbury mixer in two portions. Half of the polyethylene pellets are introduced into the Banbury mixer, and sufficient titanium dioxide to produce a final polymer product having a concentration of titanium dioxide of 1.5 weight percent is then introduced into the Banbury mixer. The remainder of the polyethylene pellets is then introduced into the Banbury mixer and the ram operated under a positive air pressure of approximately 40 p.s.i. is lowered into the mixture. The frictional heat generated at this point causes the polyethylene pellets to melt. After 4 minutes of mixing and after the mixture has reached a temperature of about 300° F., finely divided and flaked metallic aluminum is introduced into the Banbury mixer sufficient to provide a concentration of aluminum in the final polymer product of 0.5 weight percent. Mixing in the Banbury mixer is continued for another 30 seconds.

The Banbury effluent (plastic pig) is placed on a two-roll mill and the rolls heated by steam to approximately 300° F. The rolls are water cooled to approximately 100° F. and the plastic material stripped from the mill by cutting with an 8-inch knife a horizontal strip loose from the mill and pulling the continuous plastic sheet from the mill to the cutting table. The thickness of the sheet is about one-half inch.

The large sheet is then cut into 6-inch by 12-inch slabs and placed on bed-type cooling racks and after the slabs have cooled to room temperature, each slab is passed through a plastic granulator with the resultant polymer product containing aluminum and titanium dioxide additives uniformly distributed throughout the polyethylene of about 2 mesh particle size.

Various modifications can be made, or followed, in view of the foregoing disclosure, without departing from the spirit or scope thereof.

We claim:
1. A process which comprises (1) melt blending an anti-static additive with a first portion of a 1-olefin polymer, (2) forming a solid polymer containing said anti-static additive, (3) melt blending a second portion of said 1-olefin polymer with a pigment additive, (4) after step (3) has been conducted for from about 2 to about 5 minutes, blending a metallic additive selected from the group consisting of aluminum, bronze and copper with the melted 1-olefin polymer containing said pigment additive, the blending time for step (4) being in the range of 5 to 50 percent of the time required for step (3), (5) forming a solid 1-olefin polymer containing said pigment and metallic additives, (6) melt blending said 1-olefin polymer containing said anti-static additive and said 1-olefin polymer containing said pigment and metallic additives, and (7) forming a solid 1-olefin polymer containing said pigment, metallic and anti-static additives.

2. A process which comprises (1) melt blending a pigment additive with a 1-olefin polymer, (2) thereafter blending a metallic additive with the melted 1-olefin polymer containing said pigment additive, step (2) being conducted for a time within the range of 5 to 50 percent of the time required for step (1) and (3) forming a solid 1-olefin polymer containing said pigment and metallic additives.

3. The process of claim 2 wherein said 1-olefin polymer is polyethylene, said pigment additive is titanium dioxide, and said metallic additive is aluminum.

4. A process which comprises (1) melt blending a pigment additive with a 1-olefin polymer in a mixing zone, (2) passing a melted 1-olefin polymer containing said pigment additive to a milling zone comprising a roll mill, (3) contacting said melted 1-olefin polymer containing said pigment additive with a metallic additive selected from the group consisting of aluminum, bronze, and copper in said milling zone, (4) milling said polymer containing said pigment and said metallic additives for a time within the range of 5 to 50 percent of the time required for step (1), (5) passing a 1-olefin polymer containing said metallic additive and said pigment additive from said milling zone to a granulating zone, and (6) withdrawing from said granulating zone solid 1-olefin polymer particles containing said metallic and pigment additives.

5. A process which comprises (1) melt blending in a Banbury mixer a pigment additive selected from the group consisting of titanium dioxide, cadmium sulfide, phthalocyanine and ultramarine blue with a 1-olefin polymer, (2) thereafter blending a metallic additive selected from the group consisting of aluminum, bronze, and copper with the melted 1-olefin polymer containing said pigment additive, said step (2) being conducted for a time within the range of 5 to 50 percent of the time required for step (1), and (3) extruding and pelletizing said 1-olefin polymer containing said metallic and pigment additives.

6. A process which comprises (1) melt blending an anti-static additive comprising a high molecular weight amine with a first portion of a 1-olefin polymer in a mixing zone comprising a Banbury mixer, (2) passing said 1-olefin polymer containing said anti-static additive from said mixing zone to a milling zone, comprising a roll mill, (3) forming a solid polymer containing said anti-static additive, (4) passing said 1-olefin polymer containing said anti-static additive from said milling zone to a granulating zone, (5) melt blending a pigment additive selected from the group consisting of titanium dioxide, cadmium sulfide, phthalocyanine and ultramarine blue with a second portion of said 1-olefin polymer in a second mixing zone comprising a Banbury mixer, (6) thereafter blending a metallic additive selected from the group consisting of aluminum, bronze, and copper with the melted 1-olefin polymer containing said pigment additive, step (6) being conducted for a time within the range of 5 to 50 percent of the time required for step (5), (7) extruding and pelletizing the 1-olefin polymer containing said pigment and metallic additives, (8) passing the pelletized 1-olefin polymer containing said pigment and metallic additives to a third mixing zone comprising a ribbon blender, (9) passing a granulated 1-olefin polymer containing said anti-static additive from said granulating zone to said third mixing zone, and (10) extruding and pelletizing a 1-olefin polymer mix withdrawn from said third mixing zone.

7. The process of claim 6 to include passing a third portion of said 1-olefin polymer to said third mixing zone.

8. A process which comprises (1) melt blending an antic-static additive comprising a high molecular weight amine with a first portion of a 1-olefin polymer in a mixing zone comprising a Banbury mixer, (2) passing said 1-olefin polymer containing said anti-static additive from said mixing zone to a milling zone comprising a roll mill, (3) forming a solid polymer containing said anti-static additive, (4) passing said 1-olefin polymer containing said anti-static additive from said milling zone to a granulation zone, (5) melt blending a pigment additive selected from the group consisting of titanium dioxide, cadmium sulfide, phthalocyanine and ultramarine blue with a second portion of said 1-olefin polymer in a second mixing zone comprising a Banbury mixer, (6) thereafter blending a metallic additive selected from the group consisting of aluminum, bronze, and copper with the melted 1-olefin polymer containing said pigment additive, step (6) being conducted for a time within the range of 5 to 50 percent of the time required for step (5), (7) extruding and pelletizing the 1-olefin polymer containing said pigment and metallic additives, (8) passing the pelletized 1-olefin polymer containing said pigment and metallic additives to a third mixing zone comprising a cone blender, (9) passing a granulated 1-olefin polymer containing said anti-static additive from said granulating zone to said third mixing zone, and (10) extruding and pelletizing a 1-olefin polymer mix withdrawn from said third mixing zone.

References Cited
UNITED STATES PATENTS

| | | | |
|---|---|---|---|
| 2,770,609 | 11/1956 | Symonds | 260—32.6 |
| 2,878,145 | 3/1959 | Aid et al. | |
| 3,127,368 | 3/1964 | Thomson | 260—41 |
| 3,148,169 | 9/1964 | Martens et al. | 260—41 |

MORRIS LIEBMAN, *Primary Examiner.*

ALLAN LIEBERMAN, *Examiner.*